(12) United States Patent
Jacob et al.

(10) Patent No.: US 8,566,736 B1
(45) Date of Patent: Oct. 22, 2013

(54) VISUALIZATION OF VALUE RESOLUTION FOR MULTIDIMENSIONAL PARAMETERIZED DATA

(75) Inventors: Oren Jacob, Piedmont, CA (US); Eric Gregory, Larkspur, CA (US); Michael Ferris, Sunnyvale, CA (US); Robert Jensen, Berkeley, CA (US); Timothy S. Milliron, Oakland, CA (US); Brad Andalman, Oakland, CA (US)

(73) Assignee: Pixar, Emeryville, CA (US)

( * ) Notice: Subject to any disclaimer, the term of this patent is extended or adjusted under 35 U.S.C. 154(b) by 838 days.

(21) Appl. No.: 12/356,060

(22) Filed: Jan. 19, 2009

(51) Int. Cl.
*G06F 3/048* (2013.01)

(52) U.S. Cl.
USPC .......................................... 715/771; 715/764

(58) Field of Classification Search
USPC .................... 715/771, 764; 345/440
See application file for complete search history.

(56) References Cited

U.S. PATENT DOCUMENTS

| | | | | |
|---|---|---|---|---|
| 5,886,710 A * | 3/1999 | Snibbe | | 345/473 |
| 6,064,393 A * | 5/2000 | Lengyel et al. | | 345/427 |
| 6,883,929 B2 * | 4/2005 | Dowling | | 362/192 |
| 6,969,954 B2 * | 11/2005 | Lys | | 315/155 |
| 7,495,671 B2 * | 2/2009 | Chemel et al. | | 345/594 |
| 7,555,494 B2 * | 6/2009 | Matsumoto et al. | | 345/419 |
| 7,598,956 B2 * | 10/2009 | Strawn et al. | | 345/473 |
| 7,895,536 B2 * | 2/2011 | Fitzmaurice et al. | | 715/860 |
| 2002/0118875 A1 * | 8/2002 | Wilensky | | 382/173 |
| 2002/0145394 A1 * | 10/2002 | Morgan et al. | | 315/291 |
| 2005/0156932 A1 * | 7/2005 | Vienneau et al. | | 345/473 |
| 2006/0026226 A1 * | 2/2006 | Walls et al. | | 709/201 |
| 2008/0030504 A1 * | 2/2008 | Brunner et al. | | 345/473 |
| 2009/0231352 A1 * | 9/2009 | Bhatt et al. | | 345/581 |
| 2009/0265647 A1 * | 10/2009 | Martin et al. | | 715/764 |

* cited by examiner

*Primary Examiner* — Phenuel Salomon
(74) *Attorney, Agent, or Firm* — Patterson & Sheridan LLP (57) ABSTRACT

A user interface presents views of entities and their attributes relative to any subset of associated parameters. A view may present views of entities as a function of one or more parameters. A selection of a subset of entities in one view with respect to parameters may be presented in another view with respect to different parameters. Entities may be manipulated in any supplemental view to change their values or their parameter associations. A view may present components and parameters associated with layers or any subset of layers and/or after layer compositing. A view can include resolved values of components and their attributes. A supplemental view may include visual indicators to indicate the layer or other parameter defining its resolved value. Hierarchical relationships may be presented in views, with ancestor entities expanded within a view to show its descendent entities or collapsed to hide its descendent entities.

21 Claims, 10 Drawing Sheets

VISUALIZATION OF VALUE RESOLUTION FOR MULTIDIMENSIONAL PARAMETERIZED DATA

BACKGROUND

The present invention relates to the field of computer graphics, and in particular to methods and apparatus for creating, modifying, and using components to create computer graphics productions. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking and artistically compelling rendered images and animations.

Computer graphics images, animations, and other productions involving computer graphics, such as interactive entertainment software, are created from a number of different components. Generally, components include any data and instructions used to create products and applications that include computer graphics. Components can include three-dimensional models of geometry; texture maps and other arrays of data; lighting and shading programs used to determine the visual appearance of models; and animation data and deformer functions used to specify changes and motion over time.

Components typically include one or more attributes containing data associated with the component. Attributes can specify any static or varying property of a component. For example, a component may be a model of a sphere. Attributes of this example component could describe properties such as the radius of the sphere and the location of the center of the sphere. Different types of components may include different numbers and types of attributes. Components are often related to each other with complex cross-reference, inheritance, and dependency relationships.

Previously, digital productions created animations by specifying changes in attributes as a function of time. For example, a model of a sphere may be animated by specifying the change in its location attribute as a function of time. Software can then use this data to specify computer graphics data for multiple frames at different time and then render images for each frame.

As digital productions become more complicated, attribute values of components may be associated with parameters other than time. Multiple users may collaboratively author attribute values and components. Components and attributes may be grouped in different ways to improve usability and to reuse components. Portions of scenes may be created and rendered separately and then combined into a final image for a frame. Users may experiment with variations and alternate versions of scenes to determine the best result.

There is an unmet need for a user interface that enables users to view and manipulate data in association with parameters other than or in addition to time. There is also an unmet need for a user interface that clearly presents complex attribute and component relationships to users.

BRIEF SUMMARY

An embodiment of the invention includes a user interface that presents views of components and their attributes relative to any subset of the parameters associated with these components and attributes. In an embodiment, the user interface may present views of components and their attributes as a function of one or more parameters, such as time, layer, rendering pass, wedge, and/or pose.

In a further embodiment, users can select a subset of component attributes viewed with respect to one or more parameters, and then view, manipulate, and/or modify the selected component attributes with respect to one or more different parameters. Furthermore, any selection of entities in one view may be viewed with respect to other components, component attributes, component attribute values, and/or parameters in additional supplemental views. In an embodiment, users and applications can view components, component attributes, and component attribute values in any supplemental view, for example on a display axis or via a text, numerical, or graphical indicator within a supplemental view.

In still further embodiments, users and applications can manipulate components, component attributes, and component attribute values in any supplemental view, for example by changing a component attribute value or an opinion of value of a component attribute in a layer. In another example, a user or application can change or add a parameter association with a component, component attribute, or component attribute value.

In an embodiment, a supplemental view may present components and parameters associated with layers or any subset of layers and/or after layer compositing. A view can include resolved values of components and their attributes. In an embodiment, a supplemental view includes visual indicators to indicate the layer or other parameter defining its resolved value.

In an embodiment, hierarchical relationships, such as layers containing or encapsulating one or more sublayers or components encapsulating component attributes and sub-components, may be presented in multidimensional and supplemental views. In this embodiment, ancestor entities may be expanded within a view to show its descendent entities or collapsed to hide its descendent entities.

BRIEF DESCRIPTION OF THE DRAWINGS

The invention is described with reference to the drawings, in which.

DETAILED DESCRIPTION

An embodiment of the invention includes a user interface that presents views of components and their attributes relative to any subset of the parameters associated with these components and attributes. For example, an attribute value may be specified as a function of time. In addition, an attribute value may be associated with parameters such as a layer parameter, a rendering pass parameter, one or more independent wedge parameters, a component relationship; and/or a pose parameter. In an embodiment, the user interface may present views of components and their attributes as a function of one or more parameters, such as time, layer, rendering pass, wedge, component relationship, and/or pose.

Additionally, an embodiment of the invention allows users to manipulate components and their attributes in any of these views. For example, users can view a set of component attributes as a function of layer, and then select, manipulate, and/or modify only the attribute values associated with a specific layer.

In a further embodiment, users can select a subset of component attributes viewed with respect to one or more parameters, and then view, manipulate, and/or modify the selected component attributes with respect to one or more different parameters. For example, users can view component attributes as a function of layer, select a subset of component attributes in this view, and then view the selected subset of component attributes as a function of pose, rendering pass, wedge, or any other associated parameter.

Components and their attributes may be associated with many different types of parameters. For example, a component attribute may be described with reference to a time parameter, which defines the time or times at which a component attribute has a specific value. Time may be defined using any system of measuring time in animation, including hours/minute/seconds or portions thereof, and frames, feet of film. Time may also be specified as a continuous-valued or discrete-valued parameter. Time parameterizations may also include discontinuities, such as those associated with different clips or camera views.

As another example, components, component attributes, and component attribute values may be defined with reference to a pose parameter. A pose is an specific arrangement or positioning of model, a portion of a model, or group of models. A pose may also include shading, lighting, effects, behavior, or any other attribute values by associated with a given arrangement or positioning. In an embodiment, a component, component attribute, or component attribute value is associated with a pose parameter. The pose parameter specifies a pose associated with the component, component attribute, or component attribute value.

For example, a character model in a standing pose may be associated with a pose-specific hair model component, a standing posture component attribute controlling whether the character model stands upright or slouches, and an arm rotation attribute value of 90 degrees. In this example, a pose parameter associates the hair model component, the standing posture component attribute, and the arm rotation attribute value of 90 degrees with the standing pose.

In another example, components and their attributes may be defined with reference to a layering parameter. In this example, a layering parameter is a reference to one or more layers data structures suitable for use with digital production pipelines and other collaborative data creation applications. Layers data structures are described in detail in U.S. patent application Ser. No. 11/738,953, filed Apr. 23, 2007, and entitled "Layering and Referencing of Scene Description," which is incorporated by reference herein for all purposes.

Layers data structures enable the progressive refinement and incremental modification of components as needed. Cross-reference relationships to components enables the encapsulation and reuse of components. Together, this combination of layering and cross-referencing enables: data modification at any point of a collaborative workflow, in any order, without any loss of data in upstream or downstream activities of the workflow; unrestricted and progressive modification and refinement of components; unlimited branching and versioning of data at any point of the workflow; and a unified system of data specification and modification that enables any aspects of the data to be added, removed, reused, modified, or extended at any point of the workflow.

Figure 1A:
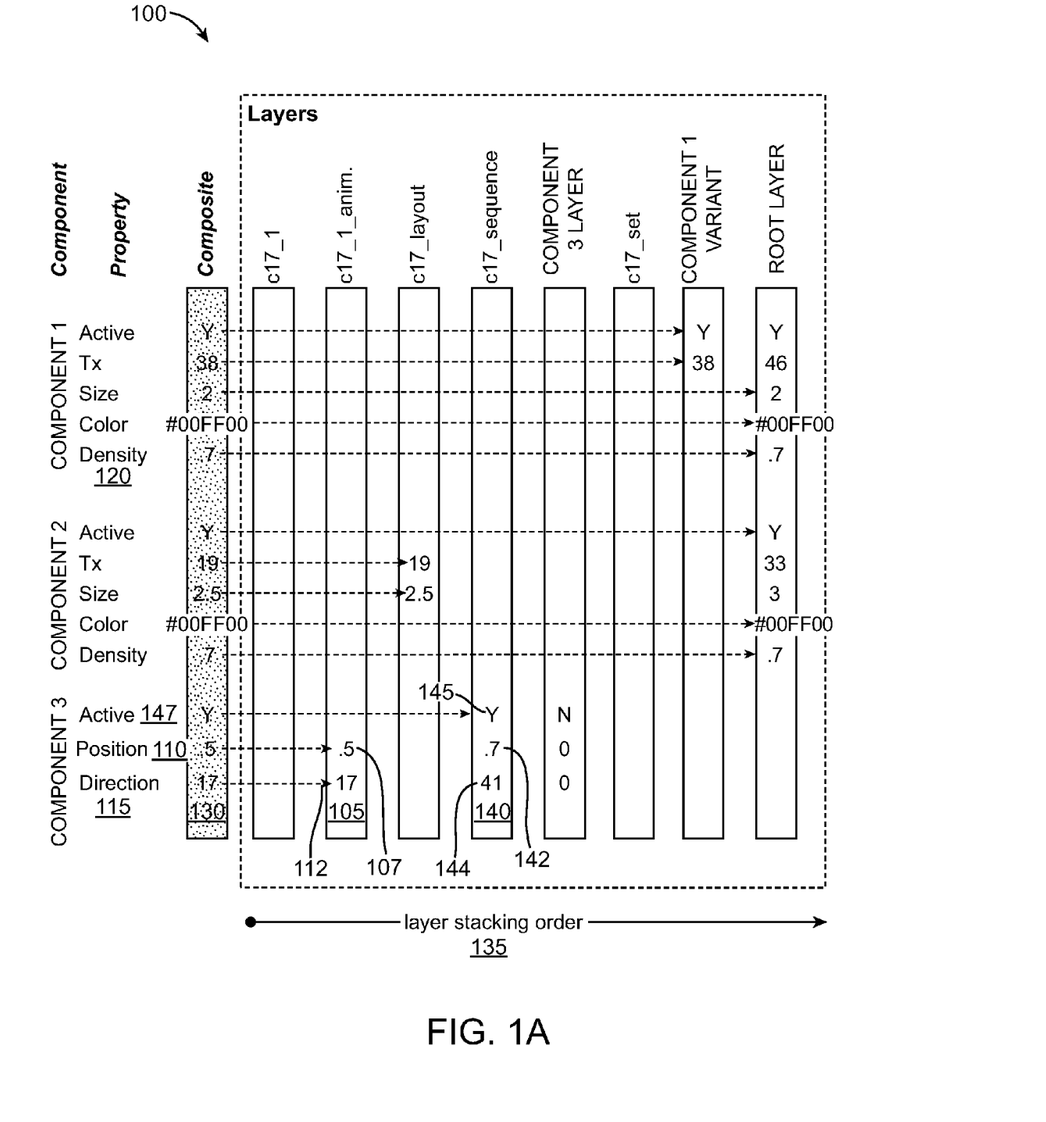
FIGS. 1A-1C illustrate example parameters associated with component attributes suitable for use with embodiments of the invention.

FIG. 1A illustrates an example layers data structure 100 suitable for use with embodiments of the invention. Layers data structure 100 specifies attributes of components in one or more scenes according to an embodiment of the invention. In an embodiment, a component in one or more scenes is represented using one or more layers of a layer data structure. The layer data structure stores opinions of attribute values for a component. In this embodiment, each non-empty layer is adapted to include an opinion of the value of at least one attribute of at least one component. As discussed in detail below, each layer can override opinions of attribute values from weaker or lower-level layers.

Each layer may be sparsely populated—that is, a layer does not have to include opinions for the value of every attribute of a component. Each layer can specify an opinion of value for a new attribute without having that attribute explicitly declared by a prior layer. A layer can include opinions of value for attributes of multiple components. Additionally, empty layers can be created in early stages of the digital production pipeline as placeholders for opinions of attribute values to be provided at later stages of the digital production pipeline.

In example layer data structure 100, layer 105 includes an opinion 107 that the position attribute 110 of component 1 should be set to a value of 0.5 and an opinion 112 that the direction attribute 115 of component 1 should be set to a value of 17. As can be seen in this example, the opinions of value of other attributes, such as the density attribute 120 of component 1, are undefined in layer 105.

In the above example, attribute values are numerical parameters. However, embodiments of layer data structure 100 allow the specification of any data type for an attribute value, including integers; floating point numbers; characters; strings; Boolean values; geometry data; compound data types such as vectors with two or more dimensions, matrices, structures, arrays, dictionaries, hash tables, elements of edit decision lists; references to one or more components; references to one or more layers; references to elements, tables, or other structures of a database; and references to internal or external functions, scripts, or executable programs.

Layers provide opinions of value for attributes of components in terms of the semantic structure associated with the components. Any arbitrary abstract attribute of a component can be expressed in a layer. Furthermore, one or more layers can provide opinions of value for the attribute of a component in the unique terms or semantic structure defined for that attribute. There is no need to reduce opinions of value of abstract attributes to a common or low-level form, such as pixels or points, to resolve or composite the values.

For example, a first layer can specify a model of a character wearing a hat. One attribute of the hat could be its type, such as "sombrero." Another attribute of the hat could be its color, such as "red." A third attribute of a hat could be its material, such as "straw." Thus, from the view of the first layer, the character model should have a red straw sombrero. A second layer that is higher or stronger than the first layer could change the type attribute of the hat from "sombrero" to "top hat." Thus, from the view of the second layer, the character model should have red straw top hat. A third layer that is higher or stronger than the second layer could specify that the color attribute of the hat should be "purple" and the material attribute should be "felt." Thus, from the view of the third layer, the character should have a purple felt top hat. In this example, each layer expresses an opinion of one or more attribute values in terms of the semantics associated with each attribute.

Furthermore, a component may include a cross-reference to another component defined by one or more layers. For example, a Hat component of a character model can be a cross-reference to a specific model of a hat. Thus, when cross-reference is set to a "sombrero" component, the character model includes a model of a sombrero. When the cross-reference is overridden by a layer to a "top hat" component, the character model is changed to include a model of a top hat. Each of these models can be defined by one or more layers, the attributes of which can be wholly or partially or overridden by other layers as described above.

In an embodiment, every activity in the digital production pipeline is associated with one or more layers. Users can create and manipulate layers manually to provide additional control and ease of use for a component. For example, the attributes of different models can be specified in separate layers. In another example, related attribute values for different models in a scene can be specified in the same layer to facilitate easy manipulation. In an embodiment, applications associated with activities can automatically create, access, and modify layers based on context, such as the activity, the type of component, and the action being performed by the user.

The complete authored state of one or more components in one or more scenes at a given point of the digital production pipeline is determined by compositing all of the layers associated with a given point to produce a composite layer 130. The composite layer 130 includes opinions of attribute values for the attributes specified by one or more of the associated layers. The composite layer 130 can also be referred to as a composite scene description.

In an embodiment, a layer stacking order 135 determines the order in which layers are composited. This in turn specifies how attribute values in one layer override corresponding attribute values in other layers. In an embodiment, layers are assigned a strength in absolute or relative terms. For example, a first layer can include a relative strength value indicating that it is stronger than or weaker than one or more other layers. In this embodiment, opinions of attribute values in stronger layers will be at the "top" of the stacking order and will override opinions of attribute values in weaker layers, i.e. layers that are "lower" in the stacking order. The example layer stacking order 135 is a linear order; however, more complicated layer stacking orders with multiple branches can be utilized. In an embodiment, layer stacking orders can be set or modified by digital production pipeline applications, either manually by a user or automatically by applications. In a further embodiment, the strength of layers is defined at least in part with respect to a root layer, such as root layer 150, which is by default the strongest or highest level layer.

In example layer data structure 100, layer 140 includes opinions 142 and 144 of the value of attributes 110 and 115. However, stacking order 135 places layer 105 as stronger than, or ahead of, layer 140. Thus, in the composite layer 130, the opinions of value 107 and 112 of layer 105 for attributes 110 and 115 will override corresponding opinions 142 and 144 in layer 140. However, as layer 105 does not define an opinion of value for attribute 147 of component 1, the opinion 145 in layer 140 will define the value of attribute 147 in the composite layer 130.

In an embodiment, a layering parameter specifies a component or component attribute's membership in one or more layers.

In addition to time, pose, and layering parameters, components and their attributes may be defined with reference to a wedge parameter. A wedge may be created to incrementally vary one or more attribute values within a scene. Rendered images or other output may be generated for each permutation of attribute values specified by a wedge. Wedges allow users to create and evaluate the effects of a range of attribute values in a scene.

Figure 1B:
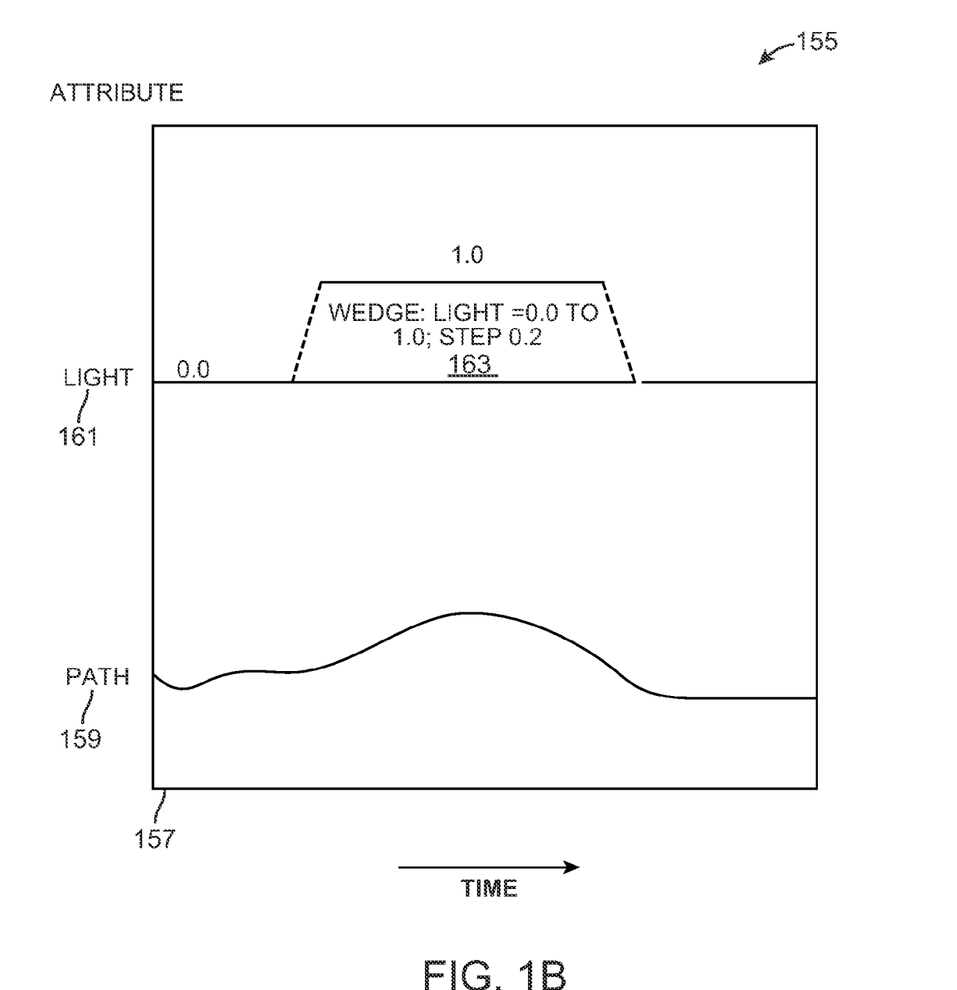

FIG. 1B illustrates an example 155 of a wedge parameter suitable for use with an embodiment of the invention. Example 115 illustrates a set of component attributes 157 with expressed with reference to time. The set of component attributes 157 includes a path attribute 159 specifying a change in position of a component, such as a model, as a function of time. The set of component attributes 157 also includes a light attribute 161 specifying the amount of illumination received by a component, such as a model.

In this example, a wedge 163 is created for the light attribute 161. Wedge 163 specifies that the value of light attribute 161 should range from 0.0 to 1.0 in steps of 0.2. Thus, wedge 163 defines six alternate versions of the scene data: wedge version 1 specifies a scene including a value of light attribute 161 of 0.0; wedge version 2 specifies a scene including a value of light attribute 161 of 0.2; wedge version 3 specifies a scene including a value of light attribute 161 of 0.4; wedge version 4 specifies a scene including a value of light attribute 161 of 0.6; wedge version 5 specifies a scene including a value of light attribute 161 of 0.8; and wedge version 6 specifies a scene including a value of light attribute 161 of 1.0.

In this example, each wedge version of the scene varies the value of the light attribute 161 while keeping the other attribute values of the scene the same. In further examples, a wedge can vary multiple attribute values at the same time, creating versions of a scene for each permutation of attribute values. In still other examples, a wedge may specify attribute values that vary over time or other parameters.

In an embodiment, a wedge parameter specifies a component or component attribute's association with a wedge. For example, a wedge parameter may specify that light attribute 161 is associated with wedge 163. In an additional embodiment, a wedge parameter associates a specific attribute value with a wedge version. For example, a wedge parameter may specify that the value of 0.6 of light attribute 161 is associated with wedge version 4.

In addition to time, pose, layering, and wedge parameters, components, component attributes, and component attribute values may be defined with reference to rendering pass parameters. A rendering pass renders all or a portion of the scene data and produces one or more rendered images as a result. Images from two or more rendering passes may be combined to produce one or more composite images. Images from rendering passes may be combined using compositing attributes of the image, such as depth values or alpha blending values associated with pixels in images, or using compositing attributes specified outside of the image, such as compositing operations specified in dataflow networks. Rendering passes allow different portions of the scene to be rendered separately, to be rendered using different rendering techniques or rendering parameters, to reuse rendered scene data without re-rendering when other portions of the scene are changed, and/or to reuse rendered scene data in multiple scenes.

Figure 1C:
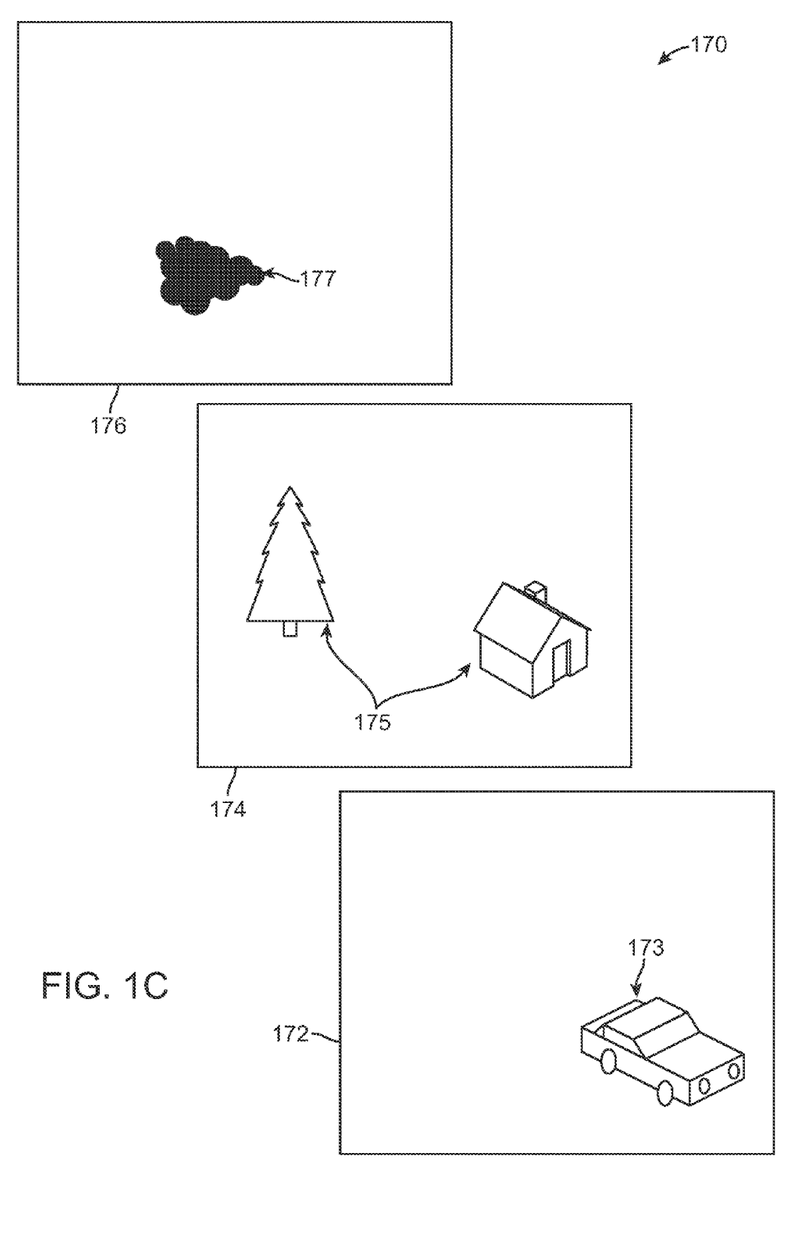

FIG. 1C illustrates an example 170 of a rendering pass parameter suitable for use with an embodiment of the invention. Example 170 includes a first rendering pass 172 for a car model 173 in the foreground, a second rendering pass 174 for background objects 175, and a third rendering pass 176 for effects such as a smoke cloud 177. In this example 170, rendering pass parameters associate the car model component, its component attributes, and its component attribute values with the first rendering pass; the background object components, component attributes, and component attribute values with the second rendering pass; and the effects component, component attributes, and component attribute values with the third rendering pass.

In further examples, a component, its component attributes, and its component attribute values may be associated with different rendering passes. For example, a car model may include a first set of component attributes associated with a first rendering pass 172 and a second set of component attributes associated with the third rendering pass 176. In this example, the first set of component attributes will be used to render the car model in the first rendering pass 172 and the second set of component attributes will be used to render the car model in the third rendering pass 176.

Because components, component attributes, and component attribute values may be associated with one or more parameters in addition to time, an embodiment of the invention includes a user interface that presents views of components and their attributes relative to any subset of the parameters associated with these components and attributes.

Figure 2:
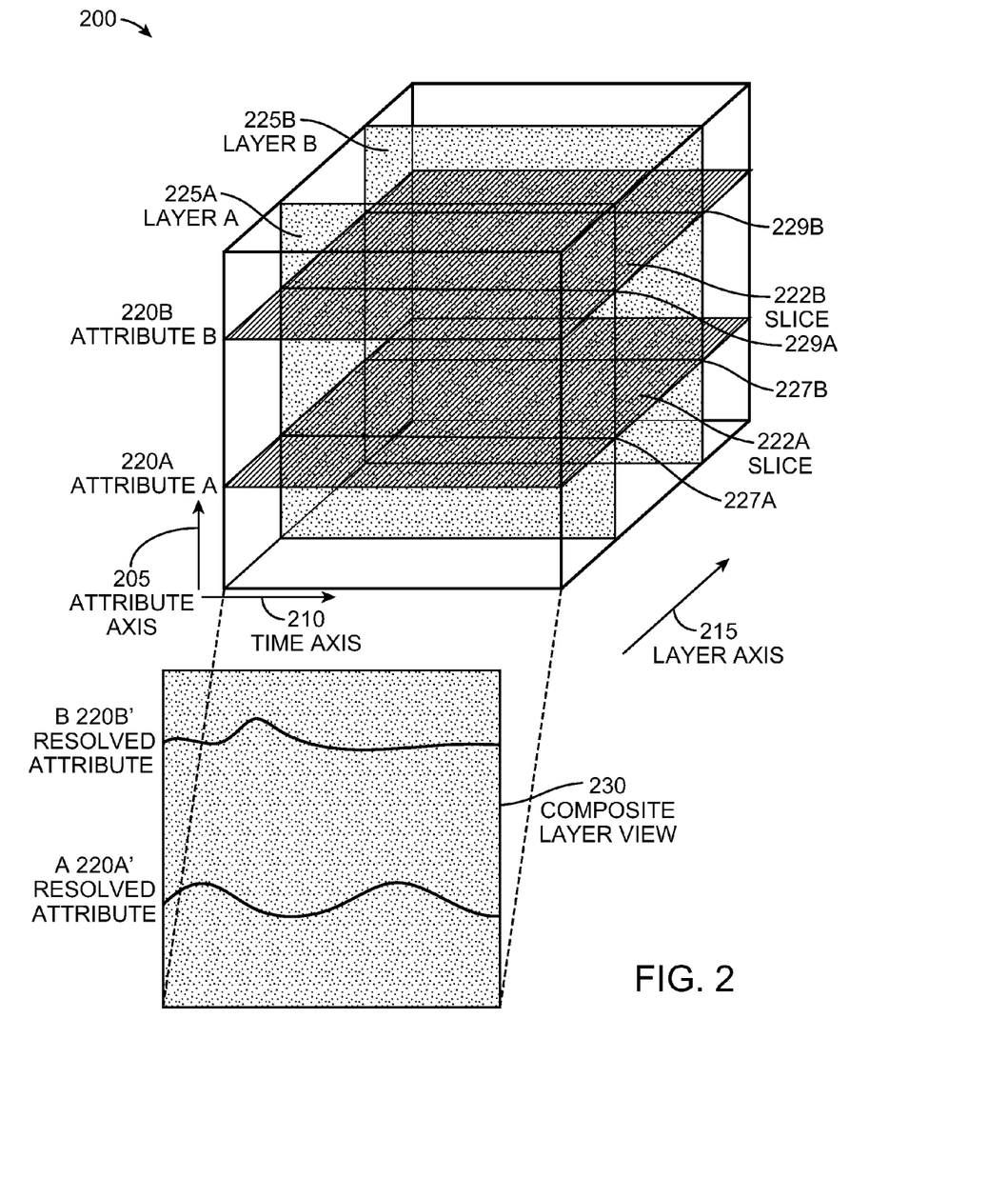
FIG. 2 illustrates an example multi-dimensional view of parameters associated with component attributes according to an embodiment of the invention.

FIG. 2 illustrates an example multi-dimensional view 200 of parameters associated with component attributes according to an embodiment of the invention. Example multidimensional view 200 presents a three-dimensional view of component attributes with respect to their time and layer parameters. In example multidimensional view 200, component attributes are arranged on a first axis 205, a time parameter is arranged on a second axis 210, and a layer parameter is arranged on a third axis 215.

Embodiments of multidimensional view 200 may display components, component attributes, and/or component attributes relative to any permutation of its associated parameters, including time, layer, rendering pass, wedge, and/or pose. In further embodiment, multidimensional view 200 may present more than three dimensions of components and their associated parameters by combining two or more dimensions of parameters along a single axis; presenting associated parameters using color, text, icons, or other visual indicators; or using any other visual technique known in the art to present multidimensional data with more than three dimensions.

Example multidimensional view 200 presents a view of component attributes with respect to both time and layer parameters. For example, multidimensional view 200 includes component attributes A 220a and B 220b. The specification of component attributes A 220a and B 220b can be viewed as slices 222a and 222b. Slice 222a represents the specification of component attribute A 220a over all time parameter values and all layer parameter values. Similarly, slice 222b represents the specification of component attribute B 220b over all time values and all layers.

Multidimensional view 200 also presents a view of component attributes specified within one or more layers. Multidimensional view 200 represents layers as vertical sections, such as layer A 225a and B 225b. The intersection 227a of layer A 225a with slice 222a represents the layer A 225a specification of the component attribute A 220a. Similarly, the intersection 227b of layer B 225b with slice 222a represents the layer B 225B specification of the component attribute A 220a. Intersections 229a and 229b of layers A 225a and B 225b with slice 222b represent layers A 225a and B 225b specifications of component attribute B 220b, respectively.

As described above, layers may be composited to specify a complete set of component attributes and component attribute values. In an embodiment, multidimensional view 200 includes a composite layer view 230 presenting the composited set of component attributes and component attribute values. In example multidimensional view 200, composite layer view 230 is shown in front of the set of layers of the multidimensional view 200. In this example 200, composite layer view 230 includes the resolved values of one or more component attributes, as determined by a composition of some or all of the set of layers specified by according to a layer relationship. Composite layer view 230 includes resolved component attribute values A 220a' and B 220b'. In this example, composite layer view 230 shows the resolved component attribute values 220' parameterized by time; however, further embodiments of the composite layer view 230 may show resolved component attribute values with respect to any other associated parameterizations, including pose, rendering pass, one or more wedges, and component relationships.

Figure 3A:
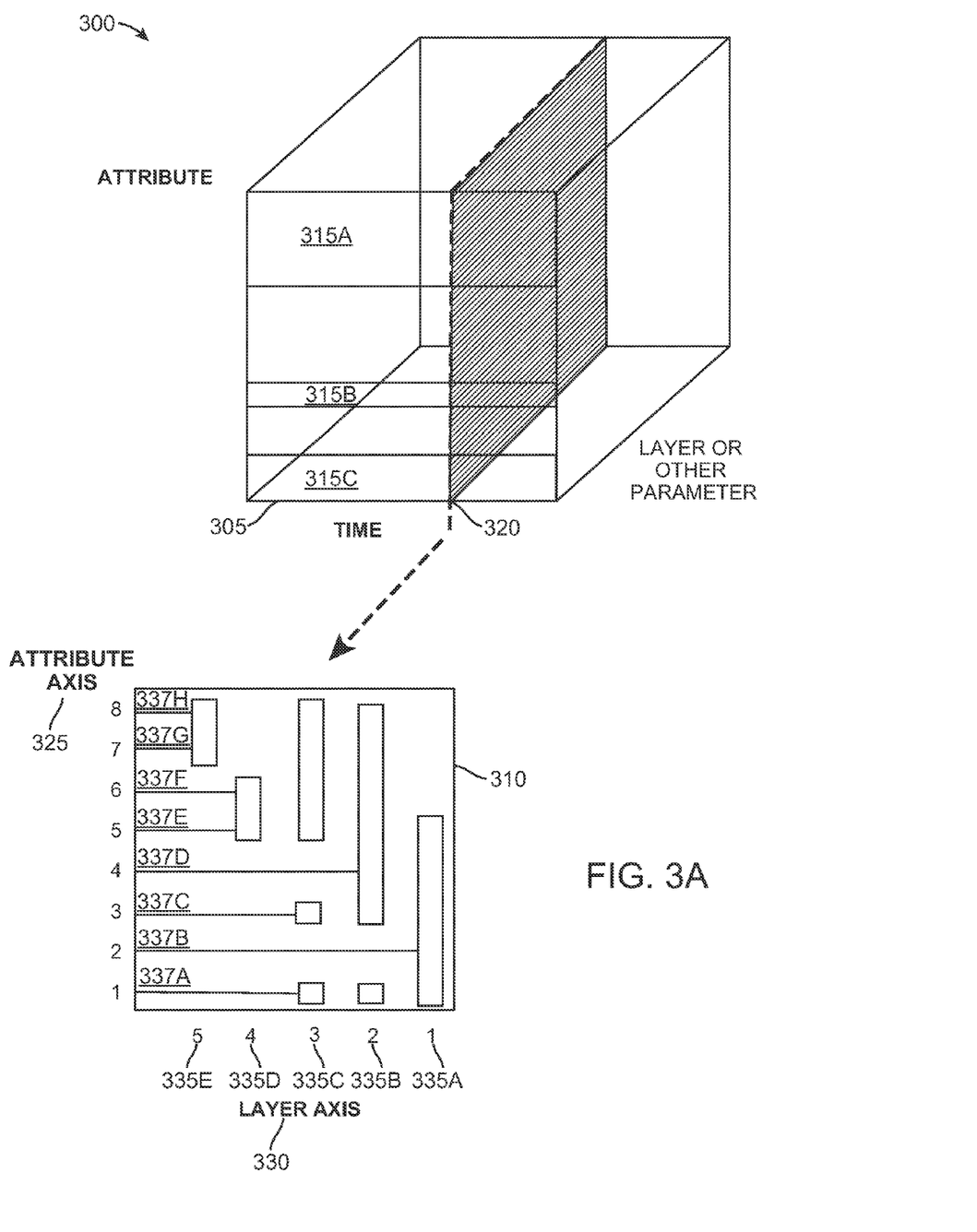
FIGS. 3A-3C illustrate an example view of attributes associated with layering parameters according to embodiments of the invention.
Figure 3B:
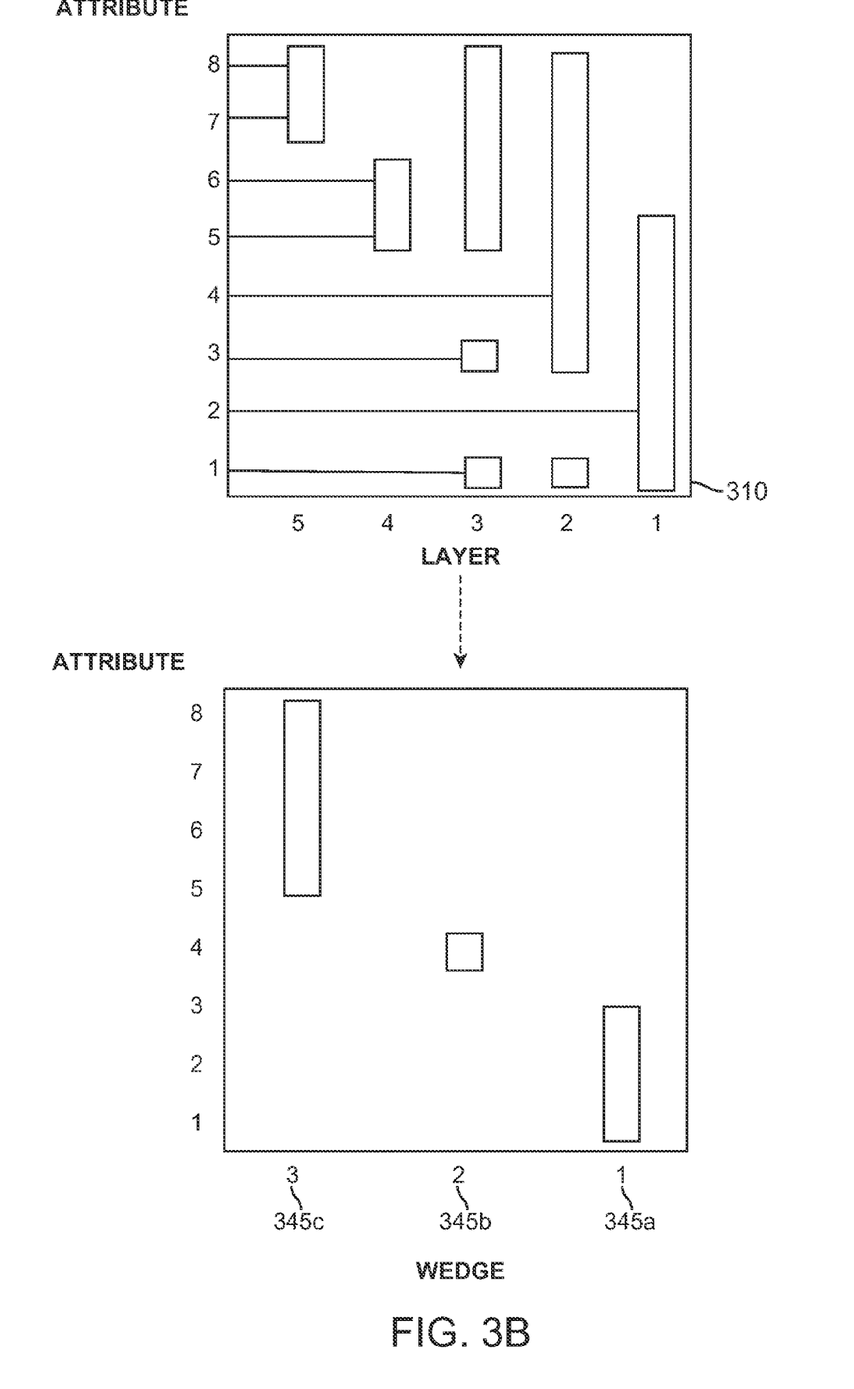
Figure 3C:
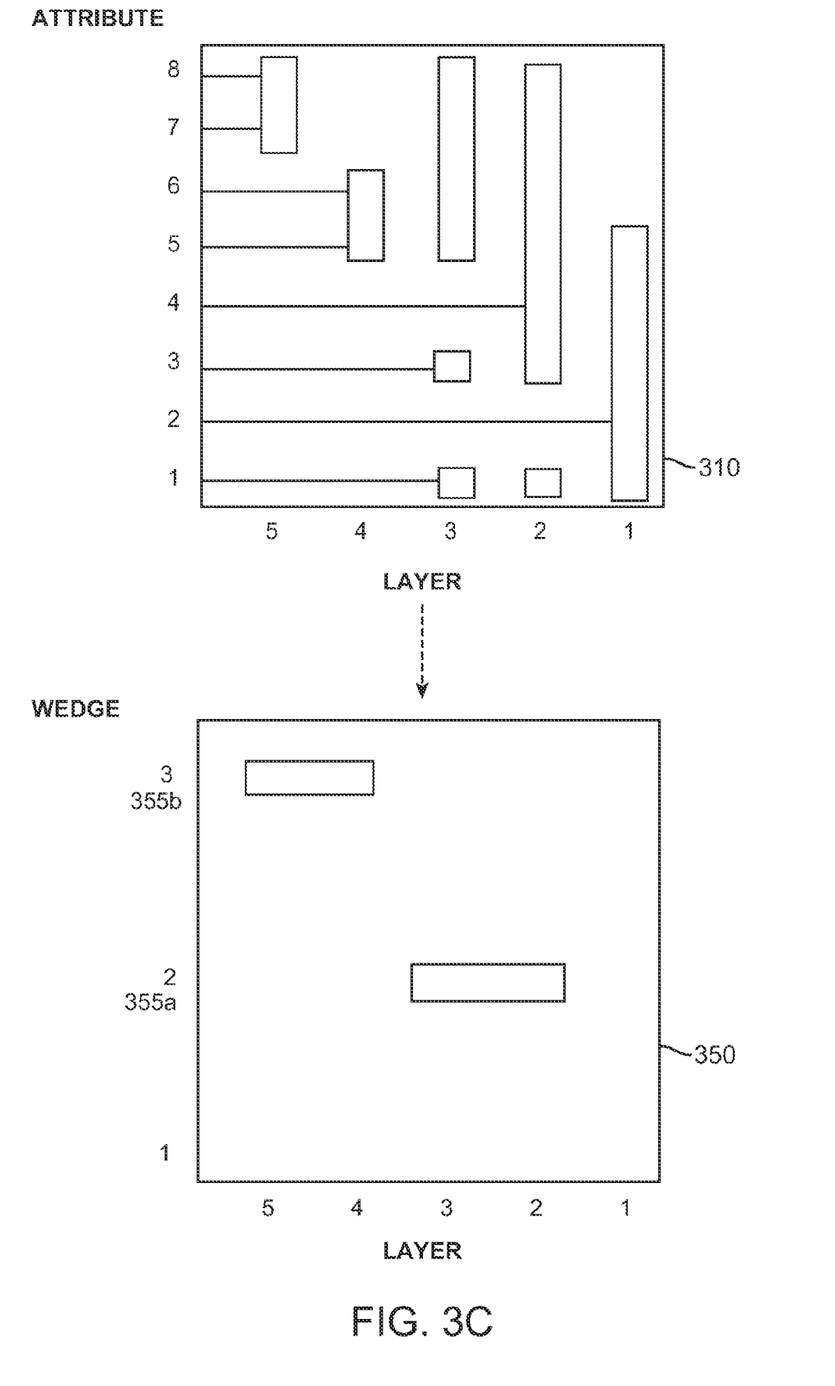

FIGS. 3A-3C illustrate example views of attributes associated with parameters according to an embodiment of the invention. FIG. 3A illustrates an example 300 of a multidimensional view 305 similar to view 200 and a supplemental view 310 derived from the multidimensional view 305. In example 300, multidimensional view 305 displays component attributes with respect to time and layer. In response to user or application input, a portion 315 of the component attributes, including portions 315a, 315b, and 315c, are selected for further inspection or manipulation. Additionally, a user or application input may optionally select an evaluation time 320.

After receiving a selection of all or a portion 315 of the component attributes and optionally an evaluation time, an embodiment of the invention receives a command from a user or application to create a supplemental view 310 of the component attributes and associated layer parameters.

Supplemental view 310 presents a view of the selected component attributes 315 with respect to their associated layers. In an embodiment, supplemental view 310 is further limited by the evaluation time 320.

Supplemental view 310 presents component attributes on a first axis 325 and layers on a second axis 330. In example 300, a visual indicator at the intersection of a row associated with a component attribute and a column associated with a layer indicates that this layer specifies an opinion of value for this component attribute. However, the final composited value of the component attribute may not include this opinion of value because of the influence of stronger layers.

For example, component attribute 6 is associated with opinions of value in layers 2 335b, 3 335c, and 4 335d. Because layer 4 335d is the strongest of these three layers, the value of component attribute 6 will be defined by layer 4 335d, with the opinions of value provided by layers 2 335b and 3 335c overridden for this component attribute.

In a further embodiment, supplemental view 310 includes visual indicators for component attributes to indicate the layer or other parameter defining its composited value. For example, lines 337a to 337h indicate the layers defining the attribute values of component attributes 1 to 8, respectively, after layer compositing. In other embodiments, other visual indicators such as colors, icons, text, and animation may be used to indicate the layers defining the attribute values of component attributes.

In an embodiment, a user or application may select some or all of the component attributes or parameters in supplemental view 310 and create one or more additional supplemental views presenting the selection with respect to other associated parameters. FIGS. 3B and 3C illustrate examples of additional supplement views derived from supplement view 310.

FIG. 3B illustrates supplemental view 310 shown in FIG. 3A and an additional supplemental view 340 derived from supplemental view 310. Additional supplemental view 340 presents a selection of all or a portion of the component attributes in supplemental view 310 with respect to a wedge parameter. In this example, a visual indicator at the intersection of a row associated with a component attribute and a column associated with a wedge indicates an association between the component attribute and the wedge. For example, component attributes 1, 2, and 3 are associated with wedge 1 345a, component attribute 4 is associated with wedge 2 345b, and component attributes 5, 6, 7, and 8 are associated with wedge 3 345c.

Similarly, FIG. 3C illustrates supplemental view 310 shown in FIG. 3A and an additional supplemental view 350 derived from supplemental view 310. Additional supplemental view 350 presents a selection of all or a portion of the layers presented in supplemental view 310 with respect to a wedge parameter. In this example, a visual indicator at the intersection of a row associated with a wedge and a column associated with a layer indicates an association between the layer and the wedge. For example, layers 2 and 3 are associated with wedge 2 355a, and layers 4 and 5 are associated with wedge 3 355b. In this example, no visual indicator is present in the column associated with layer 1; thus, layer 1 is not associated with any wedge.

Further embodiments of the invention may present supplemental views of any permutation of components, component attributes, and component attribute values with respect to any associated parameter. Furthermore, any selection of entities in one supplemental view may be viewed with respect to other components, component attributes, component attribute values, and/or parameters in additional supplemental views. In an embodiment, a supplemental view may present components and parameters associated with layers or any subset of layers and/or after layer compositing.

In an embodiment, users and applications can view components, component attributes, and component attribute values in any supplemental view, for example on a display axis or via a text, numerical, or graphical indicator within a supplemental view. In still further embodiments, users and applications can manipulate components, component attributes, and component attribute values in any supplemental view, for example by changing a component attribute value or an opinion of value of a component attribute in a layer. In another example, a user or application can change a parameter associated with a component, component attribute, or component attribute value, such as changing a layer association of a component or adding an association between a component attribute and a wedge.

In an embodiment, hierarchical relationships, such as layers containing or encapsulating one or more sublayers or components encapsulating component attributes and sub-components, may be presented in multidimensional and supplemental views. In this embodiment, ancestor entities may be expanded within a view to show its descendent entities or collapsed to hide its descendent entities.

Figure 4A:
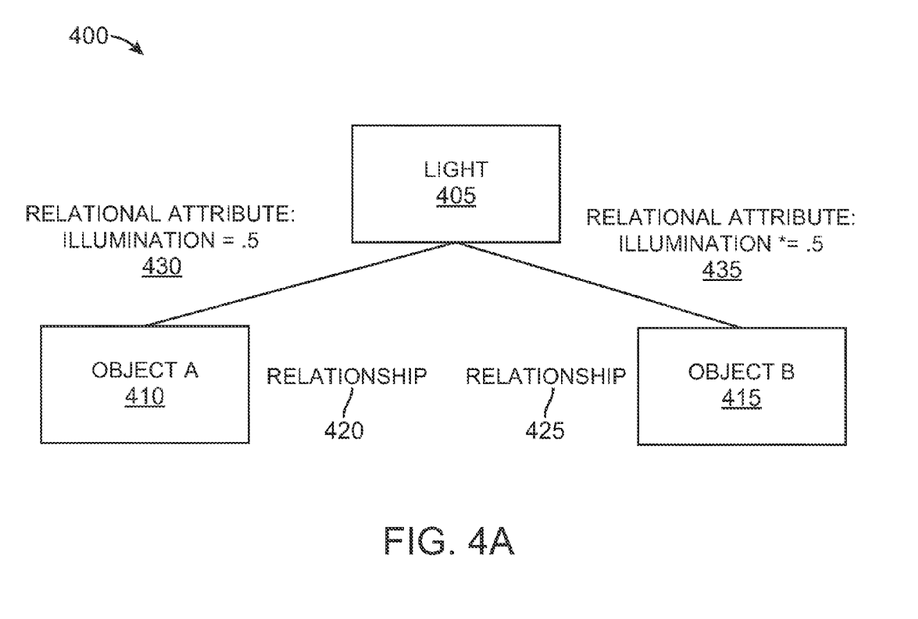
FIGS. 4A and 4B illustrate an example view of relational attributes associated with components according to an embodiment of the invention.

In an embodiment, components can be associated with each other via relationships. Relationships may be used to specify or modify an effect from one component on another component. FIG. 4A illustrates an example 400 of components and relationships suitable for use with embodiments of the invention.

Example 400 includes a light component 405 and two object components, object A 410 and object B 415. Relationships 420 and 425 associate object components 410 and 415, respectively, with light component 405. Relationships 420 and 425 provide one or more attribute values of light component 405 to object components 410 and 415. For example, light component 405 includes an illumination attribute set to 0.9, specifying an intensity of a light source. This attribute value is provided via relationships 420 and 425 to components 410 and 415, for example, to determine the shading of these objects by a light source defined by light component 405.

In an embodiment, relationships may be associated with relational attributes. Relational attributes may modify, override, or supplement the attribute values provided by one component to another via a relationship. In example 400, relationship 420 includes relational attribute 430, which overrides an illumination attribute value provided by light component 405 with a new illumination attribute value 0.5. Because relational attribute 430 is associated with relationship 420, it does not alter the effect of light component 405 on components other than component 420. Similarly, relationship 425 includes relational attribute 435, which scales the illumination attribute value of component 405 provided to component 425 by a factor of 0.5.

Relationships and relational attributes may be used for a variety of applications with computer graphics components. For example, an application of relationships and relational attributes includes animation, articulation, and deformer functions, in which relational attributes modify, override, or supplement the output of deformer functions applied to geometry, such as points on objects.

In an embodiment, relationships and relational attributes may be defined by layers. Similar to other types of attributes, layers may define relationships and/or relational attributes between components, and modify, override, or remove relationships and/or relational attributes defined by other layers. In an embodiment, relationships are parameters that may be used to view components and attributes.

Figure 4B:
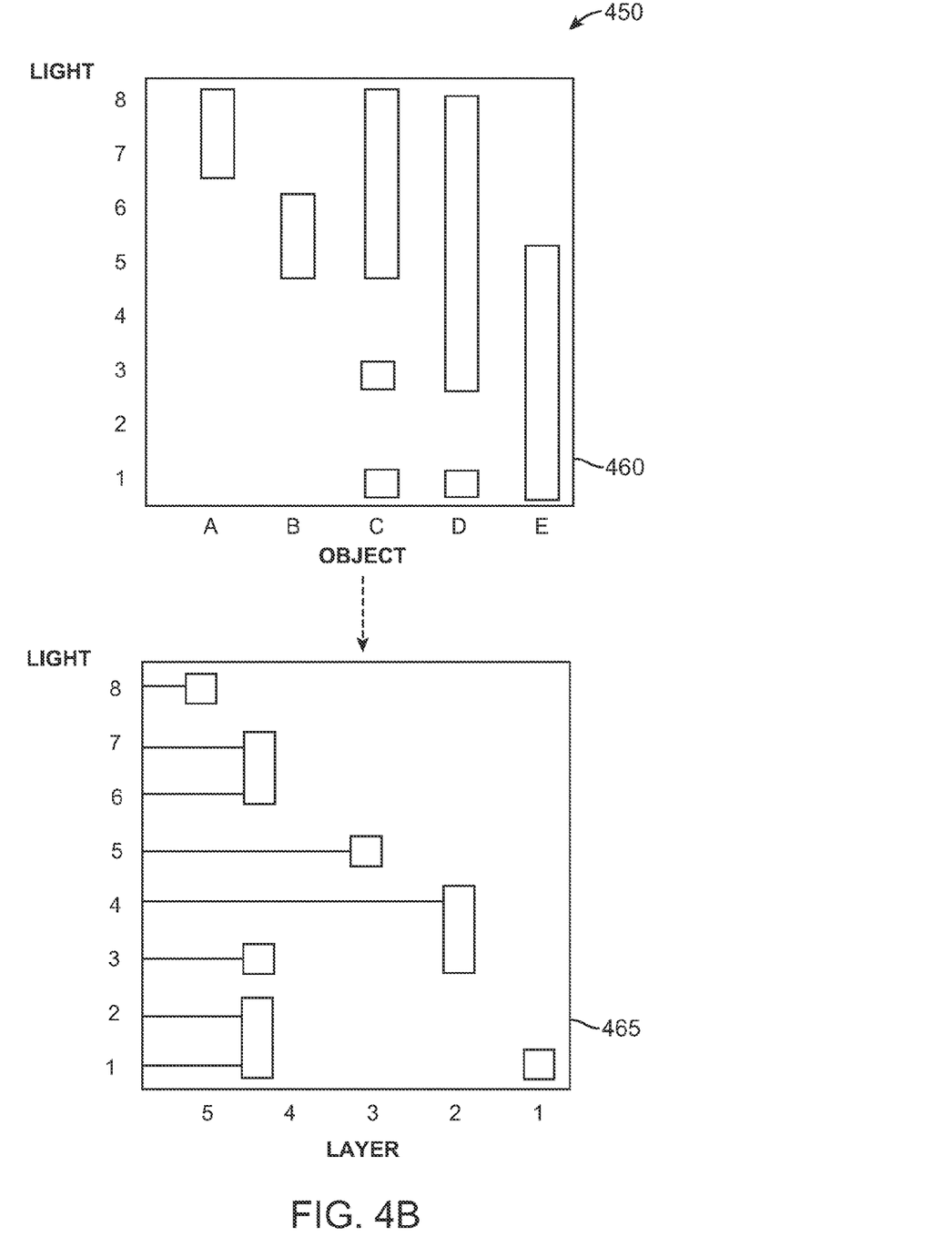

FIG. 4B illustrates an example 450 of two supplemental views of components associated with multidimensional parameters including component relationships. Supplemental view 460 includes a selection of light components on the vertical axis and object components on the horizontal axis. Visual indicators at the intersections of rows and columns indicate relationship between light and object components. In a further embodiment, the visual indicator may include an indication of an attribute value of the light component and/or of a relational attribute associated with a given relationship.

In an embodiment, the supplemental view 460 can be changed to a second supplemental view 465 showing the association between layers and relationships and/or relational attributes. In second supplemental view 465, layers are shown on the horizontal axis and light components are shown on the vertical axis. Visual indicators at the intersections of rows and columns indicate the layers assigning relationships between specific lights and object components. In a further embodiment, the visual indicator may include an indication of attribute values of the light component and/or of associated relational attributes.

As an alternative to second supplemental view 465, further supplemental views may show other parameters with respect to relationships. For example, a supplemental view may show the objects associated with relationship, rather than the light sources, assigned by layers. Other example supplemental views may show all of the relationships associated with a given light source or with a given object. Still further supplemental views may show relationships parameterized according to time, poses, passes, one or more wedges. Any of these supplemental views may include or exclude components based on component attributes, relationship attributes, or values of parameters such as time, layer, rendering pass, wedge, component relationship, and/or pose.

Embodiments of the invention allow users and/or applications to use supplemental views to inspect components, component attributes, relationships, and relational attributes with respect to any of the independent dimensions of parameterizations, including time, layer, rendering pass, wedge, component relationships, and/or pose. Further embodiments of the invention allow users and/or applications to create, modify, or otherwise interact with components, component attributes, relationships, and relational attributes using supplemental views. In still further embodiments, users and/or applications may select or identify components, component attributes, relationships, and relational attributes in one supplemental view and then inspect, create, modify, or otherwise interact with the selected or identified entities in another supplemental view. Supplemental views may be created and interacted with via a single application, via two or more applications working together, for example using an application programming interface, and/or via a scripting application programming interface.

Figure 5:
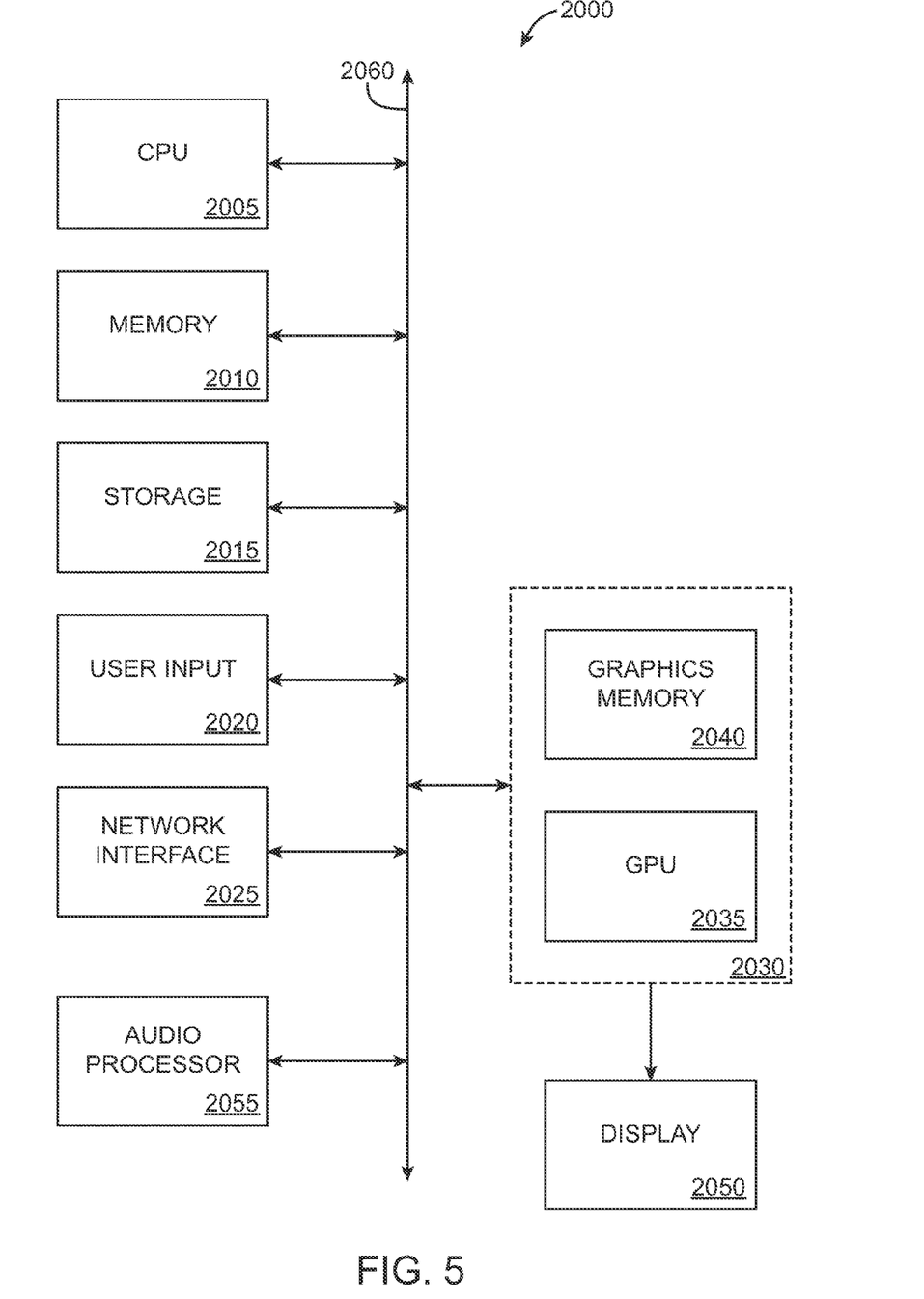
FIG. 5 illustrates a computer system suitable for implementing an embodiment of the invention.

FIG. 5 illustrates a computer system 2000 suitable for implementing an embodiment of the invention. FIG. 5 is a block diagram of a computer system 2000, such as a personal computer, video game console, personal digital assistant, other digital device, or other information processing device suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer lets, touch pads, touch screens, still or video cameras, motion sensors, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to a renderfarm or a set of server computers, each similar to computer system 2000, via the network interface 2025 or storage 2015. The renderfarm generates one or more rendered images of the scene using the provided instructions and/or data. These rendered images may be stored on computer-readable media in a digital format and optionally returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can further include one or more programmable execution units capable of executing shader programs. GPU 2035 can be comprised of one or more graphics processing unit cores.

The CPU 2005, renderfarm, and/or GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays, as well as film recorders adapted to reproduce computer generated images on photographic film. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005. In still further embodiments, all or a portion of the graphics subsystem 2030 may be omitted and software executed by CPU 2005 may perform the functions of the graphics subsystem 2030.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of displaying computer graphics data associated with multiple parameters including a time parameter, the method comprising:

displaying a first view including computer graphics data entities in association with the time parameter, wherein the computer graphics data entities comprise three-dimensional geometry used to render a sequence of one or more animation frames, wherein the computer graphics data entities are associated with layer parameters, and wherein the first view displays the computer graphics data entities as a function of the time parameter;

receiving a first selection of the computer graphics data entities in the first view; and a selection of at least a second parameter, wherein the second parameter is one of a layer parameter, a pose parameter, a rendering pass parameter, a component relationship parameter, and a wedge parameter;

generating a supplemental view from the first selection of the computer graphics data entities in the first view and the selected second parameter;

displaying the supplemental view including the first selection of the computer graphics data entities in association with the selected second parameter, wherein the supplemental view displays the first selection of the computer graphics data entities as a function of the selected second parameter, wherein the supplemental view comprises:

composited values of at least a portion of the first selection of computer graphics data entities, wherein the composited values are determined by compositing the portion of the first selection of computer graphics data entities according to their associated layer parameters and a visual indicator between the composited values and associated values of the second parameter.

2. The method of claim 1, further comprising:
receiving a second selection of a portion of the first selection in the supplemental view; and
displaying a third view including the second selection in association with a third parameter, wherein the third view displays the second selection of the computer graphics data as a function of the third parameter.

3. The method of claim 1, wherein the computer graphics data entities are selected from a group consisting of:
components, component attributes, component attribute values, and functions and/or methods of components.

4. The method of claim 1, further comprising:
receiving a modification via an interface associated with the supplemental view; and
modifying at least a portion of the first selection of computer graphics data entities in response to receiving the modification.

5. The method of claim 4, wherein the modification comprises:
a modified data value of at least the portion of the first selection of computer graphics data entities.

6. The method of claim 4, wherein the modification comprises:
an association between at least the portion of the first selection of computer graphics data entities and a third parameter.

7. The method of claim 1, wherein at least a first one of the first selection of computer graphics data entities includes an encapsulation relationship with an additional computer graphics data entity, the method comprising:
displaying the first one of the first selection of computer graphics data entities in the supplemental view;
receiving a first command; and
displaying the additional computer graphics data entity in the supplemental view in response to the first command.

8. The method of claim 7, further comprising:
displaying a visual indicator of the encapsulation relationship between the first one of the first selection of computer graphics data entities and the additional computer graphics data entity.

9. The method of claim 7, further comprising:
receiving a second command; and
removing the additional computer graphics data entity from the supplemental view in response to the second command.

10. The method of claim 1, wherein the first selection is received from a user via a user interface.

11. The method of claim 1, wherein the first selection is received from an application.

12. The method of claim 1, wherein the first selection is received from a scripting application programming interface.

13. A method of displaying data associated with multiple parameters, the method comprising:
displaying a first view including data entities associated with layer parameters, wherein the first view displays the data entities as a function of a first parameter and wherein data entities comprise three-dimensional geometry used to render a sequence of one or more animation frames;

displaying a resolved value for each of the data entities, wherein the resolved values are determined by compositing the data entities according to their associated layer parameters;

displaying a visual indicator between the resolved value and an associated value of the first parameter for each of the data entities; and receiving a first selection of the computer graphics data entities in the first view; and a selection of at least a second parameter, wherein the second parameter is one of a layer parameter, a pose parameter, a rendering pass parameter, a component relationship parameter, and a wedge parameter;

generating a supplemental view from the first selection of the computer graphics data entities in the first view and the selected second parameter;

displaying the supplemental view including the first selection of the computer graphics data entities in association with a second parameter, wherein the supplemental view displays the first selection of the computer graphics data entities as a function of the second parameter and a second visual indicator between the resolved value and an associated value of the second parameter for each of the first selection of computer graphics data entities data entities.

14. The method of claim 13, wherein the data entities are selected from a group consisting of:
computer graphics data entities, components, component attributes, component attribute values, and functions and/or methods of components.

15. The method of claim 13, further comprising:
receiving a modification via an interface associated with the supplemental view; and
modifying at least a portion of the first selection of data entities in response to receiving the modification.

16. The method of claim 15, wherein the modification comprises:
a modified data value of at least the portion of the first selection of data entities.

17. The method of claim 15, wherein the modification comprises:
an association between at least the portion of the first selection of data entities and a third parameter.

18. The method of claim 13, further comprising:
receiving a second selection of a portion of the first selection in the supplemental view; and displaying a third view including the second selection in association with a third parameter, wherein the third view displays the second selection of the data as a function of the third parameter.

19. The method of claim 13, wherein at least a first one of the data entities includes an encapsulation relationship with an additional data entity, the method comprising:
   displaying the first one of the data entities in the first view;
   receiving a first command; and
   displaying the additional data entity in the first view in response to the first command.

20. The method of claim 19, further comprising:
   displaying a visual indicator of the encapsulation relationship between the first one of the data entities and the additional data entity.

21. The method of claim 19, further comprising:
   receiving a second command; and
   removing the additional data entity from the first view in response to the second command.

\* \* \* \* \*